United States Patent
Boddy

(10) Patent No.: US 7,690,487 B2
(45) Date of Patent: Apr. 6, 2010

(54) VEHICLE DIFFERENTIAL INCLUDING PUMP WITH VARIABLE ENGAGEMENT CLUTCH

(75) Inventor: Douglas E. Boddy, Orion, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/038,011

(22) Filed: Feb. 27, 2008

(65) Prior Publication Data

US 2008/0146393 A1 Jun. 19, 2008

Related U.S. Application Data

(62) Division of application No. 11/223,568, filed on Sep. 9, 2005, now Pat. No. 7,361,114.

(51) Int. Cl.
*F16D 47/06* (2006.01)
*F16D 37/02* (2006.01)
*F16D 25/0638* (2006.01)

(52) U.S. Cl. ............ 192/21.5; 192/48.2; 192/48.3
(58) Field of Classification Search .......... 475/88
See application file for complete search history.

(56) References Cited

U.S. PATENT DOCUMENTS

| 4,567,975 | A  | * | 2/1986 | Roll ................ 192/84.961 |
| 5,967,273 | A  | * | 10/1999 | Hampton ............ 192/21.5 |
| 6,997,294 | B2 | * | 2/2006 | Ochiai et al. ........... 192/35 |
| 7,210,566 | B2 | * | 5/2007 | Baxter, Jr. ............. 192/35 |
| 2004/0231946 | A1 | * | 11/2004 | Neelakantan et al. .... 192/84.6 |
| 2006/0065070 | A1 | * | 3/2006 | Puiu ..................... 74/664 |

* cited by examiner

*Primary Examiner*—Rodney H Bonck
(74) *Attorney, Agent, or Firm*—Dykema Gossett PLLC

(57) ABSTRACT

A vehicle differential assembly is provided that includes a differential driven by an input and adapted to allow differing rotational speed between a pair of outputs. The differential includes a gear assembly connected to the outputs and a hydraulically-actuated clutch for selectively and variably coupling the outputs. A hydraulic pump is adapted to generate hydraulic fluid pressure for engagement of the hydraulically-actuated clutch. A variable-engagement clutch is operatively connected to the input and the hydraulic pump such that the input selectively drives the hydraulic pump during engagement of the clutch to provide hydraulic fluid pressure to the hydraulically-actuated clutch. A torque coupling including a variable-engagement clutch is also provided.

14 Claims, 7 Drawing Sheets

VEHICLE DIFFERENTIAL INCLUDING PUMP WITH VARIABLE ENGAGEMENT CLUTCH

RELATED APPLICATIONS

This application is a divisional application and claims priority to U.S. patent application Ser. No. 11/223,568 filed Sep. 9, 2005, entitled VEHICLE DIFFERENTIAL INCLUDING PUMP WITH VARIABLE-ENGAGEMENT CLUTCH, now allowed and hereby incorporated by reference in its entirety.

BACKGROUND

1. Field of the Invention

The present invention relates to a vehicle differential and to a vehicle differential including a hydraulic pump with a variable-engagement clutch.

2. Description of the Related Art

Differentials are provided on vehicles to permit an outer drive wheel to rotate faster than an inner drive wheel during cornering as both drive wheels continue to receive power from the engine. While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited-slip differentials were developed to shift power from the drive wheel that has lost traction and is spinning to the drive wheel that is not spinning.

Recently, an electronically-controlled, limited-slip differential has been introduced that includes a hydraulically-actuated clutch to limit differential rotation between output shafts of the differential. The hydraulically-actuated clutch is powered by a pump connected to a vehicle drive shaft. Most of the time, the vehicle has adequate traction negating the need to actuate the hydraulic clutch. However, provided the drive shaft is rotating, the pump is still operating and pumping fluid. In this arrangement, the differential requires one or more valves to distribute pressurized fluid to the hydraulically-actuated clutch when needed. The parasitic energy losses generated by the continually operating pump can negatively impact vehicle fuel economy and shorten the useful life of the hydraulic fluid. For at least these reasons, an improved differential is desired.

SUMMARY

A vehicle differential assembly is provided that includes a differential driven by an input and adapted to allow differing rotational speed between a pair of outputs. The differential includes a gear assembly connected to the outputs and a hydraulically-actuated clutch for selectively and variably coupling the outputs. A hydraulic pump is adapted to generate hydraulic fluid pressure for engagement of the hydraulically-actuated clutch. A variable-engagement clutch is operatively connected to the input and the hydraulic pump such that the input can selectively drive the hydraulic pump during engagement of the clutch to provide hydraulic fluid pressure to the hydraulically-actuated clutch. Other aspects of the invention will be apparent to those skilled in the art after review of the drawings and detailed description provided below. A torque coupling including a variable-engagement clutch is also provided.

BRIEF DESCRIPTION OF THE DRAWINGS

Embodiments of the invention will now be described, by way of example, with reference to the accompanying drawings, wherein.

DETAILED DESCRIPTION

Figure 1:
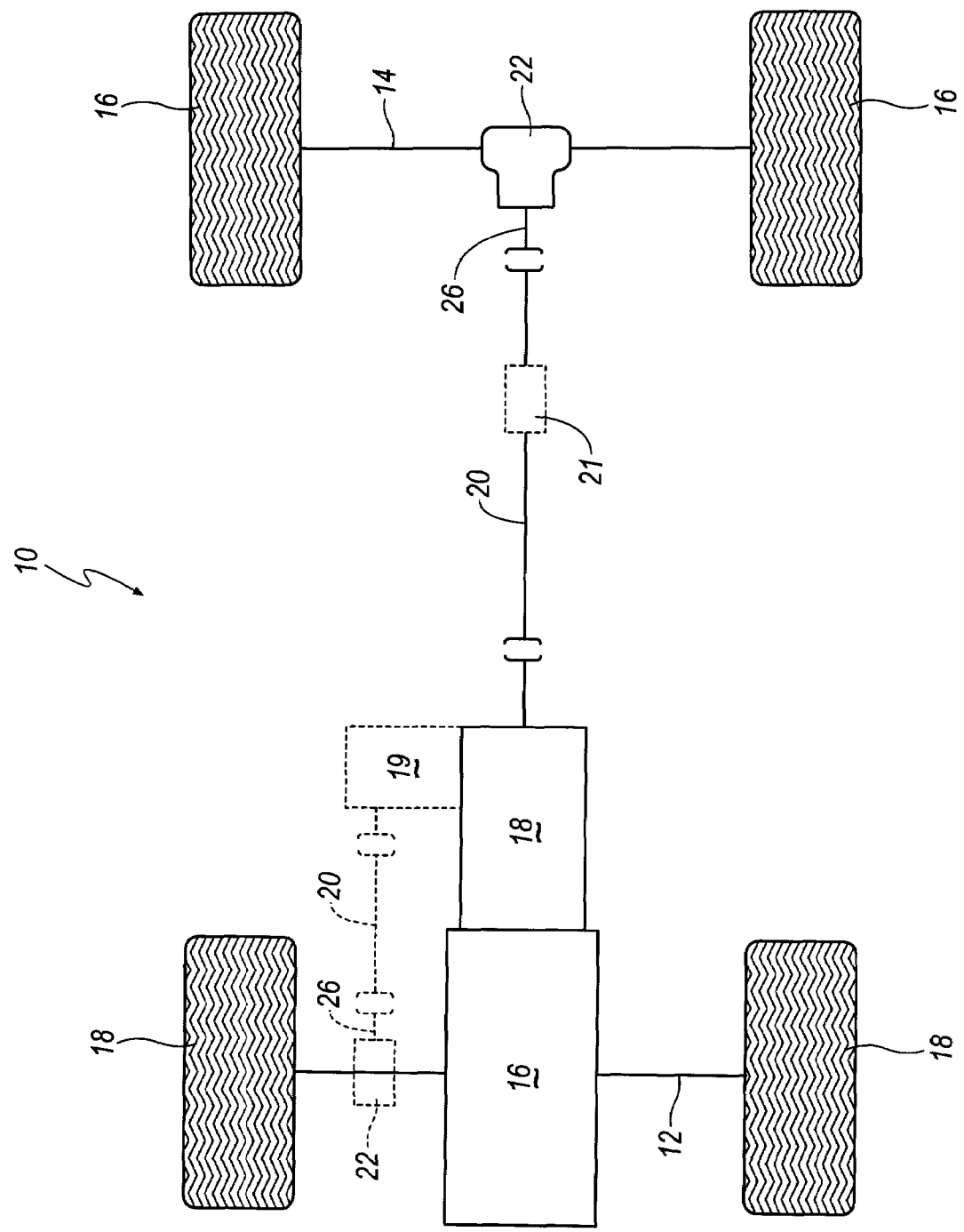
FIG. 1 is a schematic illustration of a vehicle powertrain system including a differential assembly and torque coupling according to embodiments of the present invention.

Referring now to the drawings, several embodiments of the present invention are shown. The drawings are not necessarily to scale and certain features may be simplified or exaggerated to better illustrate and explain the present invention. Further, the embodiments set forth herein are not intended to be exhaustive or otherwise limit or restrict the invention to the precise configurations shown in the drawings and disclosed in the following detailed description.

Referring to FIG. 1, an exemplary automotive vehicle 10, such as a passenger car, sport utility vehicle or light truck, is shown that includes first and second vehicle axles 12 and 14, respectively, a prime mover 16, such as an internal combustion engine, and a power transmission mechanism 18. In the illustrated embodiment, second axle 14 serves as the primary vehicle-propelling drive axle to which primary drive wheels 16 are operatively connected. In contrast, first axle 12 serves as a secondary axle to which a steering wheel may be connected. Optionally, first axle 12 may also function as a vehicle-propelling drive axle adapted to receive torque from a transfer case 19 (shown in phantom in FIG. 1) that apportions torque between primary and secondary drive axles 12, 14. Torque may be transmitted to axles 12 and 14 through one or more prop or drive-shafts 20, an optional torque coupling 21 according to an embodiment of the present invention, and a differential assembly 22 according to an embodiment of the present invention. Vehicle 10 shown in FIG. 1 is provided by way of example only and may include other powertrain arrangements, such as, for example, a primary front drive arrangement in which first axle 12 serves as the primary drive axle.

Figure 2:
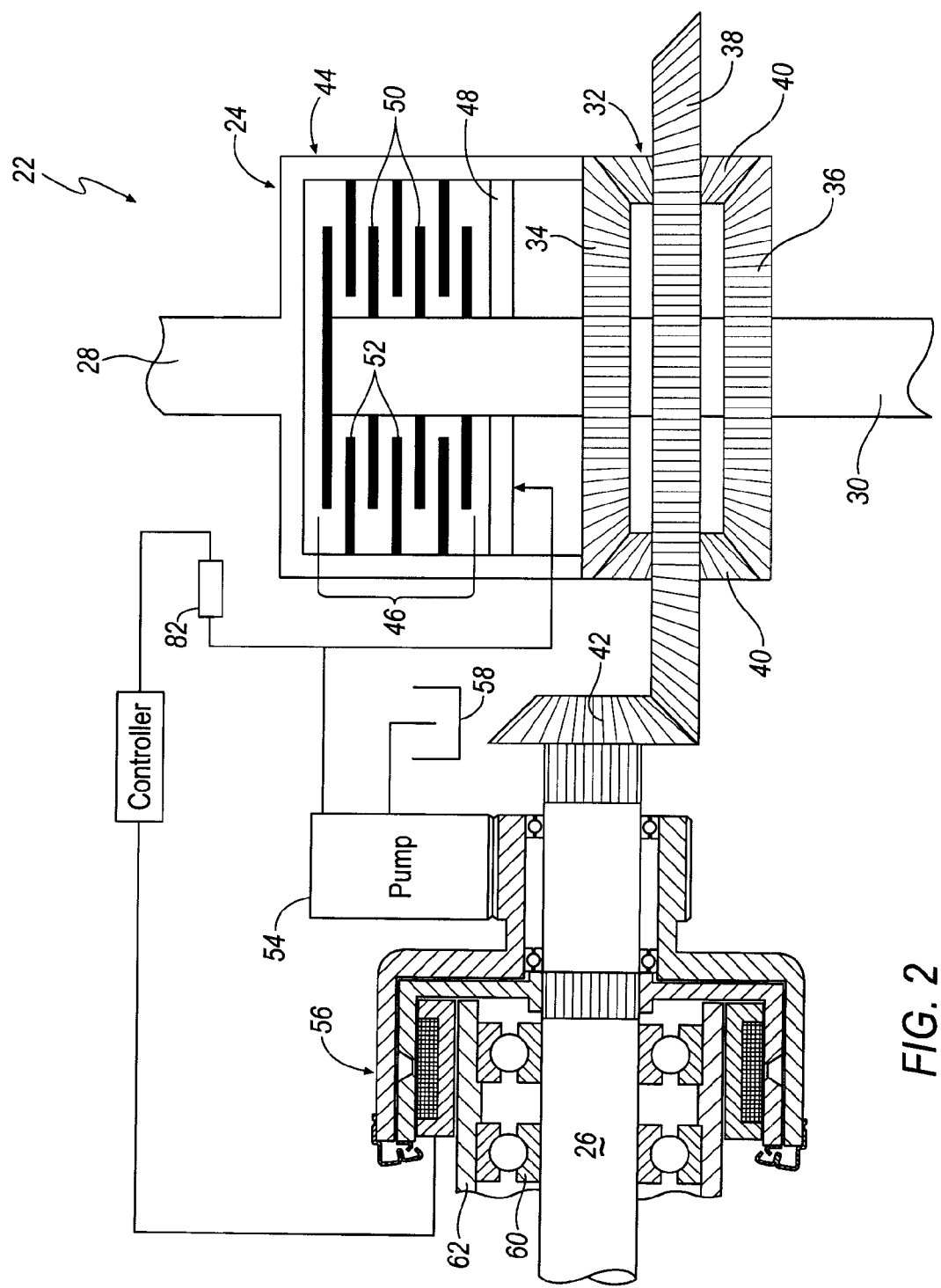
FIG. 2 is a schematic illustration of a differential assembly according to an embodiment of the present invention.
Figure 3:
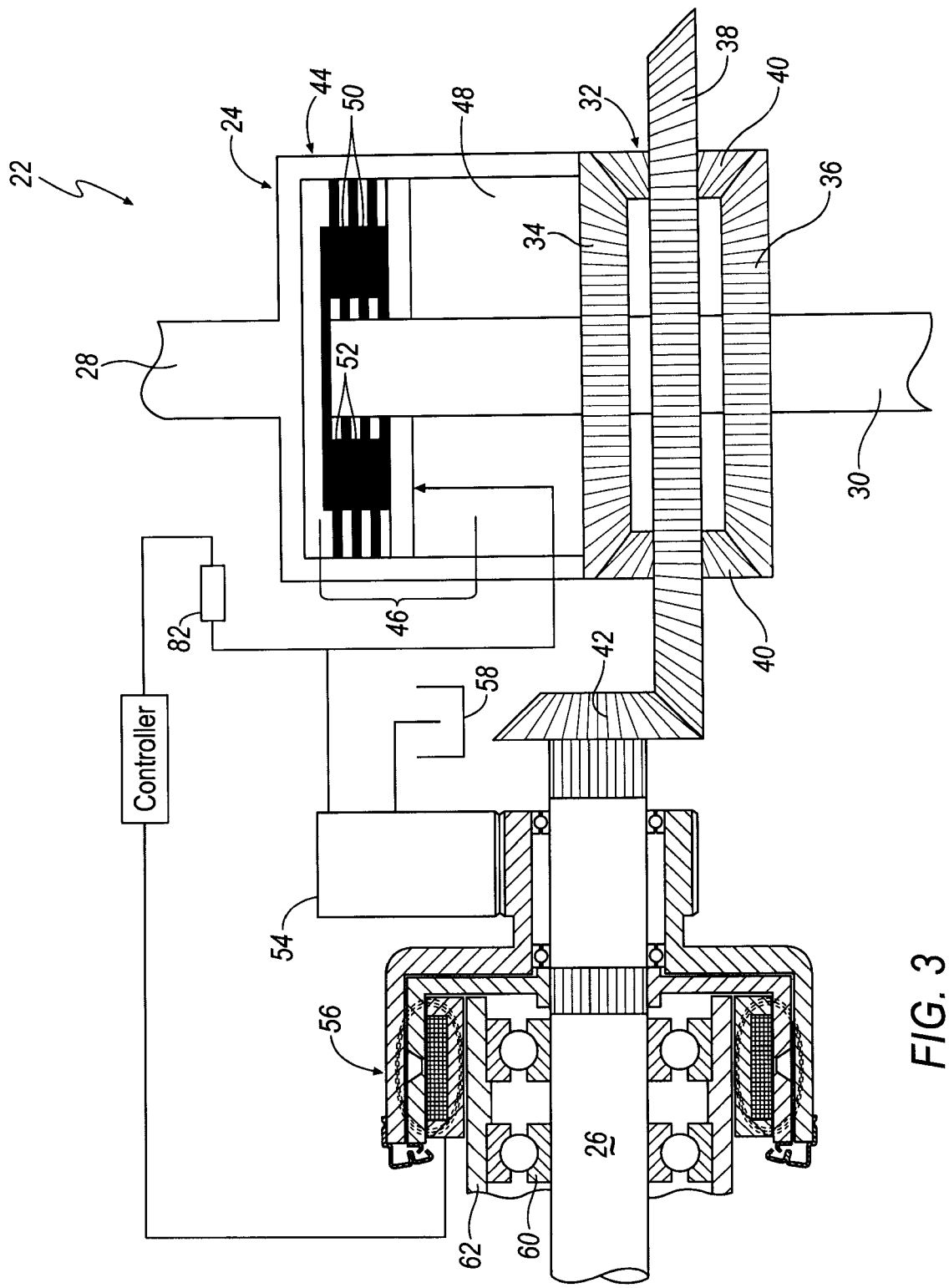
FIG. 3 is a schematic illustration of the differential assembly of FIG. 2 shown during engagement of a variable-engagement clutch and a hydraulically-actuated clutch.

Referring to FIGS. 2 and 3, an embodiment of differential assembly 22 is shown. In the illustrated embodiment, differential assembly 22 is a hydraulically-assisted, electronically-controlled, limited-slip differential that is capable of providing variable torque distribution between a pair of outputs 28 and 30, which, if desired, can range up to full axle lock. Differential 22 may be used as a stand-alone product or, instead, if desired, may be integrated with another vehicle system, such as a vehicle's antilock brake system (ABS) or stability control package, to provide enhanced vehicle dynamics.

As shown in FIG. 2, differential assembly 22 includes a differential 24 that is driven by an input 26 and adapted to allow differing rotational speed between outputs 28, 30. A gear assembly 32, which may include a pair of side gears 34 and 36, is connected to a corresponding one of outputs 28, 30. A ring gear 38 may include a pair of pinion gears 40 that, for example, may mesh with side gears 34, 36. Input 26 includes a rotatable pinion shaft having a pinion gear 42 the meshes with ring gear 38.

A hydraulically-actuated clutch 44 selectively and variably couples outputs 28, 30 when torque transfer therebetween is desired. In the illustrated embodiment, hydraulically-actuated clutch 44, which is shown schematically for illustration, includes a multi-disk clutch pack 46 and a clutch pack-compressing actuator 48 (e.g., a piston) that is movable in response to application of hydraulic fluid pressure. At least one first friction disk 50 is connected for rotation with output 30 and at least one second friction disk 52 is connected for rotation with output 28. The embodiment of hydraulically-actuated clutch 44 generically shown in FIGS. 2 and 3 is provided by way of reference only and it will be appreciated that other fluid power assisted clutch configurations that selectively and variably couple outputs 28, 30 may be employed in differential assembly without departing from the scope of the present invention. For example, hydraulically-actuated clutch 44 may comprise any type of axially actuated clutch, such as a single disk clutch, a multi-disk clutch or a cone clutch. A square jaw clutch or a spiral jaw clutch may also be used; however, these clutches do not necessarily proportionally transmit torque.

Differential assembly 22 also includes a hydraulic pump 54 adapted to generate hydraulic fluid pressure for engagement of hydraulically-actuated clutch 44. In an embodiment, hydraulic pump 54 is a gerotor pump driven by a variable-engagement clutch 56 operatively connected to input 26 such that input 26 selectively and variably drives hydraulic pump 54 during engagement of variable-engagement clutch 56. To minimize parasitic losses associated with operation of hydraulic pump 54 when pressurized fluid is not needed, variable-engagement clutch may be operated only when fluid power is required by hydraulically-actuated clutch 44 and the level of engagement is tailored to the degree of engagement desired in hydraulically-actuated clutch 44. In this manner, the valves and other apparatus required to distribute fluid power in various conventional electronically-controlled, limited-slip differentials may be eliminated. A housing (not shown) may surround differential 24, hydraulic 54 pump, and variable-engagement clutch 54, and may include a sump 58 from which hydraulic pump 54 draws hydraulic fluid for pressurization and transfer to hydraulically-actuated clutch 44.

In an embodiment, variable-engagement clutch 56 may be a magnetic particle clutch that transmits torque between input 26 and pump 54 in proportion to the electric current supplied to it. While clutch 56 is generally described herein as a magnetic particle clutch, other types of variable-engagement clutches, such as clutches that employ electro-restrictive media to transmit torque between two relatively rotating members, may also be used in differential assembly 22 without departing from the scope of the present invention.

Figure 4:
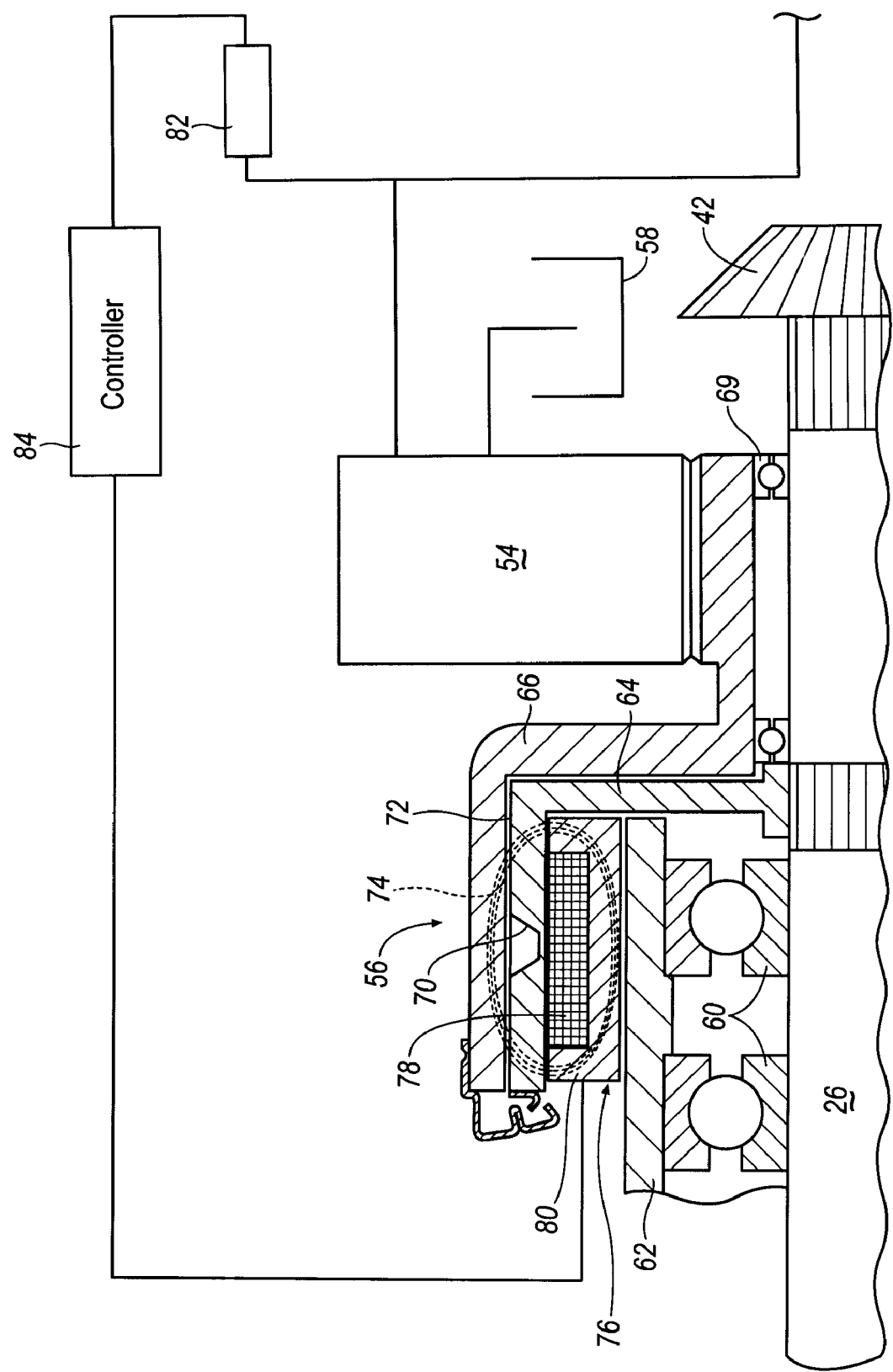
FIG. 4 is an enlarged view cross-sectional view of the variable-engagement clutch shown in FIGS. 2 and 3.

In the illustrated configuration, variable-engagement clutch 56 is supported on input 26 by bearings 60 that may be positioned within a generally cylindrical support 62 that can be attached to the housing surrounding differential 24, hydraulic pump 54 and variable-engagement clutch 54. As generally shown in FIG. 4, a rotatable and generally cylindrical input member 64 may be operatively connected to input 26, a rotatable and generally cylindrical output member 66 is operatively connected to hydraulic pump 54. A medium 68 (such as a rheological medium; see, e.g., FIGS. 5A and 5B) is disposed between input and output members 64, 66. In the illustrated embodiment, input and output members 64, 66 are splined to input 26 and pump 54, respectively. Any number of other bearings, such as bearings 69, may be used to facilitate rotation of input and output members 64, 66 relative to input 26 and/or the differential assembly housing.

Input and output members 64, 66 generally exhibit magnetic properties, but may include at least one generally non-magnetic feature 70. As will be described in further detail below, magnetic flux will follow a path of least resistance (i.e., a path of highest magnetic permeance). Non-magnetic features 70 make the path through medium 68 and output member 66 an easier magnetic path (with higher magnetic permeance) than the short circuit through input member 64.

Figure 6:
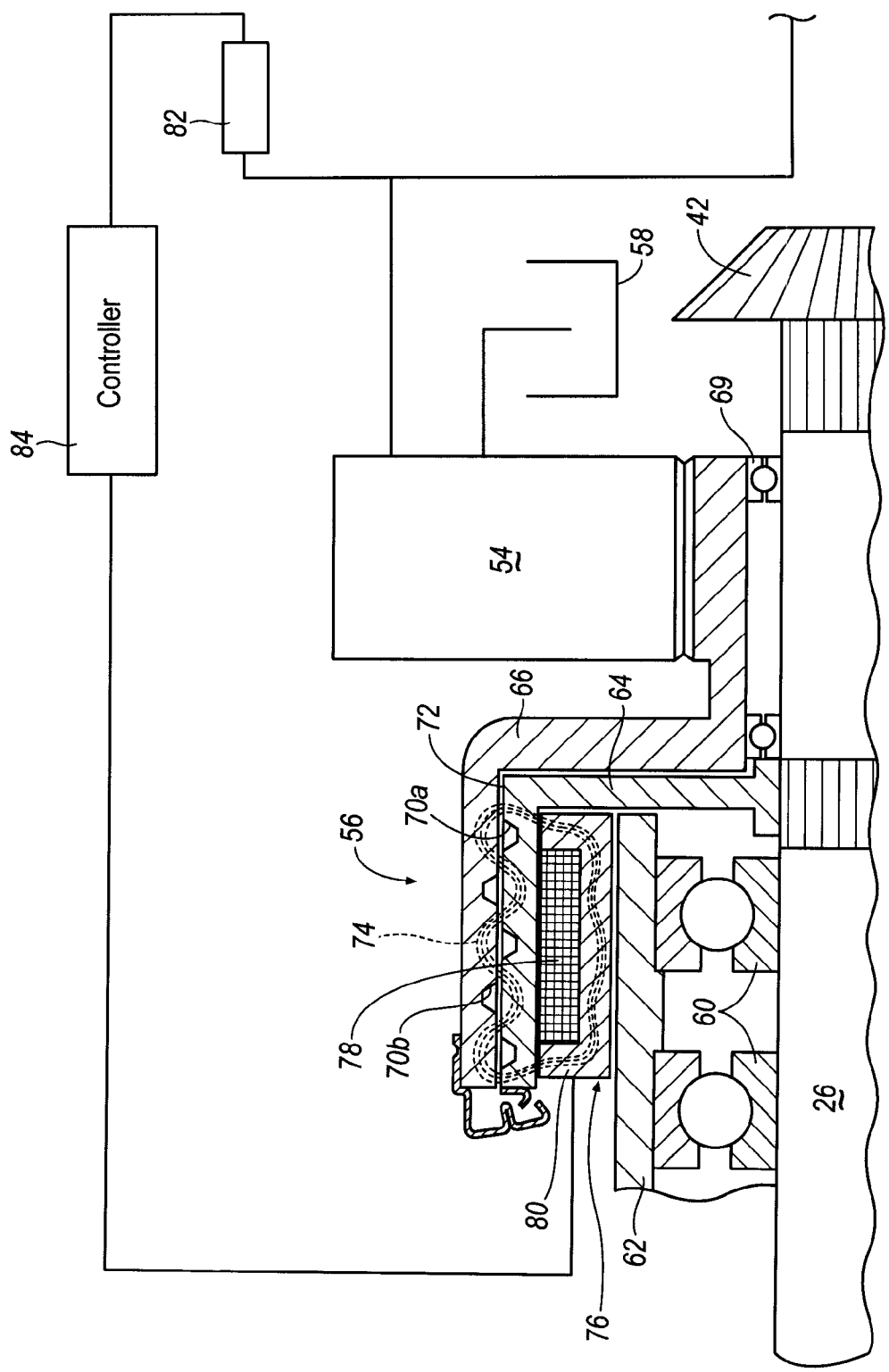
FIG. 6 is a cross-sectional view of a variable-engagement clutch according to another embodiment of the present invention.

Referring to embodiment shown in FIG. 4, non-magnetic feature 70 may comprise a groove having a generally trapezoidal cross-section, but is not necessarily limited thereto. Alternatively, non-magnetic feature 70 may comprise, for example, a non-magnetic ring or slot disposed substantially or completely through the corresponding input or output member 64, 66. Moreover, non-magnetic feature 70 may be disposed on a surface of input or output member 64 or 66, or may be disposed substantially or completely through input and output members 64, 66. The number of magnetic features 70 included in input and output members 64, 66 may depend on, for example, the torque transferring requirements of clutch 56. In the embodiment illustrated in FIGS. 2-4, for example, input member 64 includes a single non-magnetic feature 70. In the embodiment shown in FIG. 6 by comparison, output member 66 includes a plurality of non-magnetic features 70b located radially outwardly of a point equidistantly between non-magnetic features 70a in input member 64.

Figure 5A:
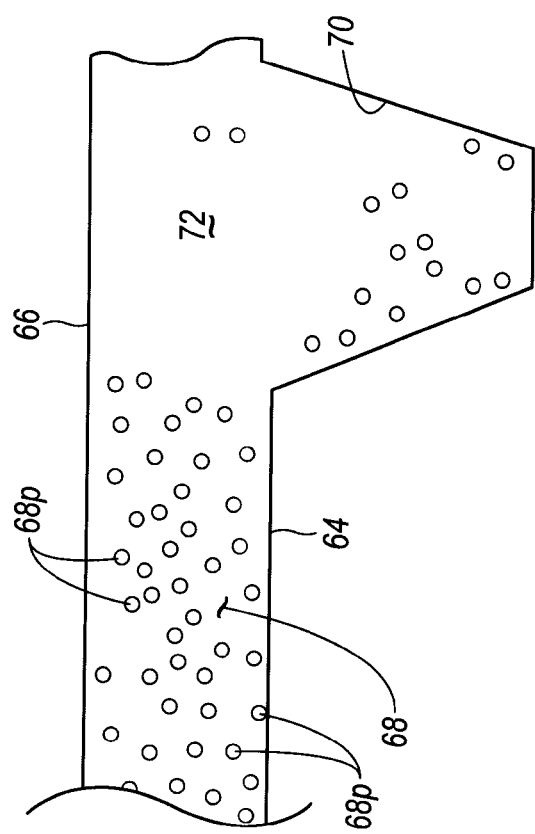
FIGS. 5A and 5B are schematic illustrations of a medium during disengagement and engagement, respectively, of the variable-engagement clutch shown in FIGS. 2-4.
Figure 5B:
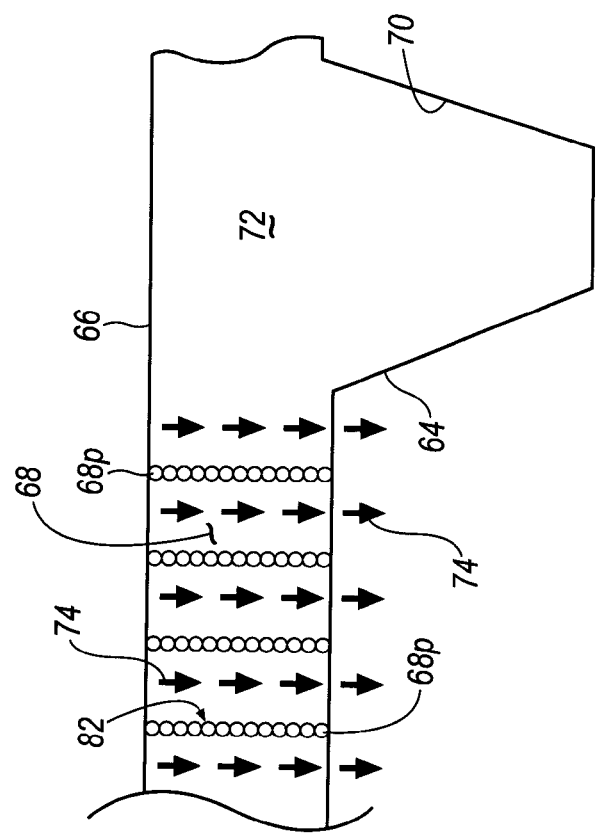

Input member 64 and output member 66 are not in contact, and may define therebetween a substantially uniform gap 72. Gap 72 should be wide enough to permit a thin layer of medium 68 (see, e.g., FIG. 5A), such as a magnetically reactive powder (e.g., iron powder), to reside between input and output members 64, 66. As shown in FIGS. 5A and 5B, the non-magnetic properties of features 70 aid in concentrating and directing lines of magnetic flux 74 across gap 72.

Variable-engagement clutch 54 also includes a source of magnetic flux 76, which may include, for example, an electromagnet mounted on the outside of support 62 between input member 64 and support 62. In the illustrated embodiment, source 76 includes a wire-wound coil 78 surrounded by a generally toroidal shell 80. As is well known, an electrical current applied to coil 78 can generate a magnetic field in the vicinity of source 76, the intensity of which is proportional to the level of current provided. Alternatively, source 76 may comprise other arrangements, including, for example, a permanent magnet supplemented by a counteracting electromagnet so that clutch 56 will default to being engaged should the electromagnet fail.

It is well known that lines of magnetic flux 74 travel a path substantially through structures with known magnetic properties. As illustrated in FIG. 4, lines of magnetic flux 74 exit rigid shell 80 into input member 64, whereby flux 74 saturates input member 64. Upon saturation, lines of magnetic flux 74 follow a path of least resistance and traverse gap 72 into output member 66. The narrowest width of features 70 is best designed to be greater than the width of gap 72, thus preventing flux 74 from traversing features 70 and short-circuiting medium 68. Upon entry into output member 66, flux 74 saturates output member 66 and then re-traverses gap 72 into input member 64. In the embodiment shown in FIG. 6, this process is repeated to weave flux 74 across gap 72 between features 70a and 70b until the number of non-magnetic features is exhausted.

As shown in FIG. 5B, magnetically reactive particles 68p can change formation in relation to the intensity of the magnetic field, for example, by aligning with lines of magnetic flux 74 as flux 74 traverses gap 72. Magnetically reactive particles 68p under the influence of a magnetic field can link or lock into chains 82, increasing the shear force and creating a mechanical friction against the surfaces of input and output members 64, 66 facing gap 72. The increased shear and friction result in a transfer of torque between input member 64 and output member 66.

In an embodiment, differential assembly 22 may also include a control system having a pressure sensor 82 for monitoring the hydraulic fluid pressure generated by hydraulic pump 54 and a controller 84, such as an microprocessor-based electronic control unit (ECU), adapted to vary the electric current supplied to variable-engagement clutch 56 to control the degree of hydraulic clutch 44 engagement in response to the hydraulic fluid pressure generated by hydraulic pump 54, such as in a closed-loop fashion. Controller 84 may include sufficient memory to store logic rules, generally in the form of a computer program, for controlling operation of variable-engagement clutch 56 and may be adapted to receive one or more inputs from various vehicle sources, such as a speed sensor, steering sensor, torque sensor or other vehicle controller, to determine when to activate clutch 56. It will be appreciated by those skilled in the art that the present invention is not limited to any particular type or configuration of ECU or to any specific control logic. Additionally, controller 84 may be integrated into differential assembly 22 and adapted to receive information from a vehicle communication bus, or may be contained in one or more vehicle controllers, such as the main vehicle ECU.

When it is desired to operate hydraulic clutch 44 by engaging variable-engagement clutch 56, an appropriate electrical signal can be transmitted to source of magnetic flux 76 to create a magnetic field, which as described above, can alter the properties of medium 68 to cause a transfer of torque between input member 64 and output member 66. In an embodiment, variable-engagement clutch 56 exhibits a nearly linear relationship between its output torque and the current applied to source 76, up to the magnetic saturation point of clutch 56. Accordingly, the amount of torque transferred between input and output members 64, 66 may be selectively controlled by varying the current applied to source 76, such that a partial engagement may be achieved when it is desirable, or a full engagement may be achieved when it is needed and acceptable. For example, when only minimal torque transfer between outputs 28 and 30 is desired, clutch 56 may be partially engaged, whereas when full axle lock is desired, clutch 56 may be fully engaged. Gradual engagement of clutch 56 also eliminates or reduces vehicle lurch caused by conventional limited-slip differentials having an output-locking clutch that engages in a virtual ON/OFF manner.

The input current to operate clutch 56 may be applied in two parts: (i) an engagement current required to fully engage the clutch; and (ii) a steady state current representing a predetermined current required to maintain clutch 56 fully engaged. An unlimited number of strategies for controlling engagement of clutch 56 may be generated, for example, by varying at least one of: (i) the level of engagement current; (ii) the rate of application of engagement current; and (iii) the rate of reduction of engagement current. The greater the magnitude and application rate of engagement current, the faster the engagement of clutch 56. As previously described, the engagement of clutch 56 is, at least in part, a function of the strength of the magnetic field generated by the source of magnetic flux 74, which in turn is related to the electric current applied to coil 78. When relatively fast engagement of clutch 56 is desired, the engagement current may be higher than the steady state current to overcome the inertial effects of the rotating input and output members 64, 66 coming up to speed. When a relatively slow engagement of clutch 56 is desired, the engagement current may be slowly ramped toward the steady state current.

The application of input current to source 76 may also be accomplished by pulse width modulating (PWM) the electrical signal provided by controller 84. According to this method, an electrical signal having a predetermined current, for example the current corresponding to the magnetic saturation point of clutch 56, is pulsed at a predetermined frequency, which results in a lower overall mean input current being applied to source 78. For example, without limitation, an electrical signal with a current value of 6 amps could be pulsed 50% of the time resulting in approximately one-half of the input power associated with 6 amps being applied to source 76. As will be appreciated, pulse width modulating the engagement current may reduce the maximum power input to source 76 resulting in a more efficient operation of clutch 56.

Because of the potentially linear (or substantially linear) relationship between the application of current and output torque of clutch 56, it is possible to apply an input current to source 76 that permits the output member 66 to slip relative to input member 64 resulting in clutch 56 being only partially engaged. When partially engaged, a lesser amount of torque is transferred from input member 64 to output member 66 than would be transferred if clutch 56 were fully engaged. Thus, the resulting speed at which output member 66 drives pump, and accordingly the output pressure of pump 54, may be varied according to the input current provided to clutch 56.

As will also be appreciated, clutch 56 may be engaged to operate pump 54 when there is substantially no difference in speed between outputs 28 and 30—a feature useful in vehicle stability control applications. For example, over-steer is a condition where a vehicle is making too tight of a turn for a given vehicle speed, which may result in the vehicle spinning out of control. During over-steer, the difference in speed between outputs 28, 30 is relatively low and is generally not indicative of a loss of traction in a drive wheel. Engagement of clutch 56 allows the vehicle to lock rotation of outputs 28, 30, which effectively speeds up the inner drive wheel to correct the over-steer condition.

Figure 7:
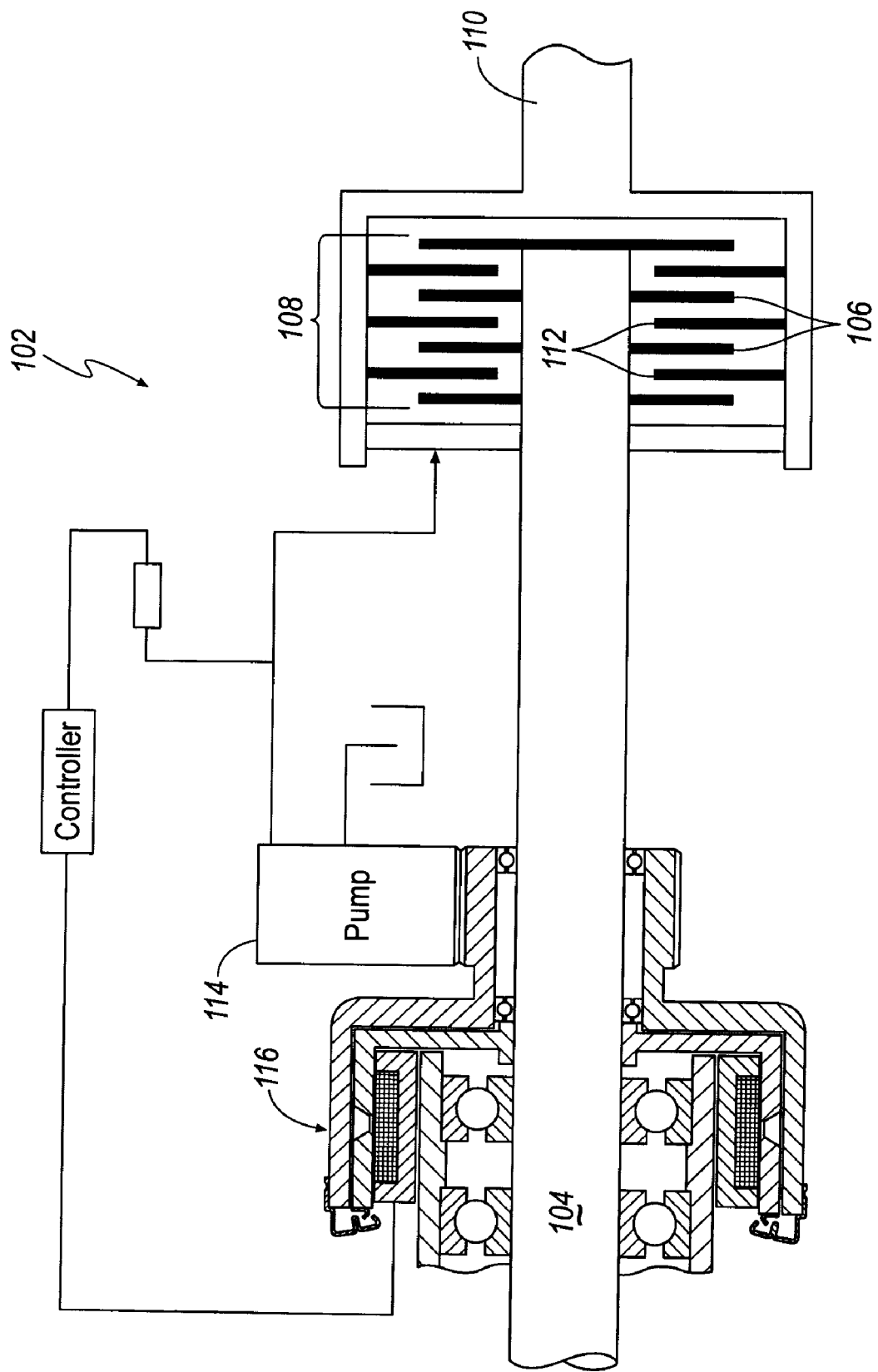
FIG. 7 is a schematic illustration of a torque coupling according to an embodiment of the present invention.

Referring to FIG. 7, a cross-sectional view of a torque coupling 102 according to an embodiment of the present invention is shown. In the illustrated embodiment, torque coupling 102 is substantially similar to differential assembly 22 in both structure and operation with at least one exception, namely, torque coupling 102 does not include a differential component 24. Instead, an input 104 is operatively connected to at least one friction disk 106 of a multi-disk clutch pack 108 and an output 110 is operatively connected to at least one friction disk 112. Operation of torque coupling 102 is substantially similar to operation of differential assembly 22 in that a hydraulic pump 114 is driven by a variable-engagement clutch 116 operatively connected to input 104 such that input 104 selectively and variably drives hydraulic pump 114 during engagement of variable-engagement clutch 116 to selectively compress clutch pack 108 and transfer torque between input 104 and output 110.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A torque coupling assembly comprising:
   an input, an output, and a hydraulically-actuated clutch for selectively and variably coupling the input to the output;
   a hydraulic pump adapted to generate hydraulic fluid pressure for engagement of the hydraulically-actuated clutch; and
   a variable-engagement clutch operatively connected to the input and the hydraulic pump such that the input selectively and variably drives the hydraulic pump during engagement of the variable-engagement clutch to provide hydraulic fluid pressure directly from the hydraulic pump to the hydraulically-actuated clutch.

2. The assembly of claim 1, further including a control system having a pressure sensor for monitoring the hydraulic fluid pressure generated by the hydraulic pump and a controller adapted to control the degree of engagement of the variable-engagement clutch in response to the hydraulic fluid pressure generated by the hydraulic pump.

3. The assembly of claim 2, wherein the controller is adapted to vary the electric current supplied to the variable-engagement clutch to control the degree of clutch engagement.

4. The assembly of claim 1, wherein the variable-engagement clutch comprises a magnetic particle clutch.

5. The assembly of claim 1, wherein the variable-engagement clutch includes a rotatable input member operatively connected to the input, a rotatable output member operatively connected to the hydraulic pump, and a medium disposed between the input and output members.

6. The assembly of claim 5, wherein the input member and the output member include a plurality of non-magnetic features configured to weave flux between the input member and the output member non-magnetic feature.

7. The assembly of claim 1, wherein the hydraulic pump is a gerotor pump.

8. The assembly of claim 1, wherein the hydraulically-actuated clutch includes a multi-disk clutch pack and a clutch pack-compressing actuator that is movable in response to application of hydraulic fluid pressure.

9. A torque coupling assembly comprising:
   an input, an output, and a hydraulically-actuated clutch for selectively and variably coupling the input to the output, the hydraulically-actuated clutch including a multi-disk clutch pack and a clutch pack-compressing actuator that is movable in response to application of hydraulic fluid pressure;
   a hydraulic pump adapted to generate hydraulic fluid pressure for engagement of the hydraulically-actuated clutch;
   a variable-engagement clutch comprising a magnetic particle clutch and operatively connected to the input and the hydraulic pump such that the input variably drives the hydraulic pump during engagement of the variable-engagement clutch to provide hydraulic fluid pressure directly from the hydraulic pump to the hydraulically-actuated clutch; and
   a control system having a pressure sensor for monitoring the hydraulic fluid pressure generated by the hydraulic pump and a controller adapted to control the degree of engagement of the variable-engagement clutch in response to the hydraulic fluid pressure generated by the hydraulic pump.

10. The assembly of claim 9, wherein the controller is adapted to vary the electric current supplied to the variable-engagement clutch to control the degree of clutch engagement.

11. The assembly of claim 9, wherein the hydraulic pump is a gerotor pump.

12. A torque coupling assembly comprising:
    an input, an output, and a hydraulically-actuated clutch for selectively and variably coupling the input to the output;
    a means for generating hydraulic fluid pressure for engagement of the hydraulically-actuated clutch; and
    a variable-engagement clutch operatively connected to the input and the means for generating hydraulic fluid pressure such that the input selectively drives the means for generating hydraulic fluid pressure during engagement of the variable-engagement clutch to variably provide hydraulic fluid pressure directly from the means for generating hydraulic fluid pressure to the hydraulically-actuated clutch.

13. The assembly of claim 12, further including a means for monitoring the hydraulic fluid pressure generated by the means for generating hydraulic fluid pressure and a means for controlling the degree of engagement of the variable-engagement clutch in response to the hydraulic fluid pressure generated by the means for generating hydraulic fluid pressure.

14. The assembly of claim 13, wherein the means for controlling the degree of engagement is adapted to vary the electric current supplied to the variable-engagement clutch to control the degree of clutch engagement.

* * * * *